United States Patent [19]

Thurmond et al.

[11] Patent Number: 5,356,537
[45] Date of Patent: Oct. 18, 1994

[54] METHOD AND APPARATUS FOR TREATING WASTE WATER

[75] Inventors: Jesse M. Thurmond; Charles O. Peters, both of Little Elm, Tex.

[73] Assignee: No Sludge, Inc., Little Elm, Tex.

[21] Appl. No.: 50,809

[22] Filed: Apr. 21, 1993

Related U.S. Application Data

[63] Continuation-in-part of Ser. No. 889,853, May 28, 1992.

[51] Int. Cl.$^5$ ............... C02F 3/12; C02F 11/02
[52] U.S. Cl. .................. 210/607; 210/625; 210/626
[58] Field of Search ............ 210/607, 623, 624, 629, 210/626

[56] References Cited

U.S. PATENT DOCUMENTS

| | | | |
|---|---|---|---|
| 2,477,815 | 8/1949 | Mallory | 210/625 |
| 2,517,792 | 8/1950 | Krauss | 210/625 |
| 3,047,492 | 7/1962 | Gambrel | 210/625 |
| 3,220,706 | 11/1965 | Valdespino | 210/625 |
| 3,386,911 | 6/1968 | Albertson | 210/625 |
| 3,591,491 | 7/1971 | Smith et al. | 210/625 |
| 3,753,897 | 8/1973 | Lin et al. | 210/625 |
| 4,280,665 | 7/1981 | Adams, III et al. | 241/62 |
| 4,289,625 | 9/1981 | Tarman et al. | 210/603 |
| 4,334,997 | 6/1982 | Peterson | 210/603 |
| 4,488,968 | 12/1984 | Hong et al. | 210/625 |
| 4,514,297 | 4/1985 | Enqvist | 210/194 |
| 4,575,427 | 3/1986 | Ysern de Arce et al. | 210/751 |
| 4,626,354 | 12/1986 | Hoffman et al. | 210/603 |
| 4,705,633 | 11/1987 | Bogusch | 210/625 |
| 4,735,724 | 4/1988 | Chynoweth et al. | 210/603 |
| 4,743,376 | 5/1988 | Elmaleh et al. | 210/617 |
| 4,780,208 | 10/1988 | Bohnke et al. | 210/605 |
| 4,857,198 | 8/1989 | Meidl | 210/603 |
| 4,885,093 | 12/1989 | Schoenberger | 210/605 |
| 4,915,840 | 4/1990 | Rozich | 210/605 |
| 4,915,841 | 4/1990 | Lagana' et al. | 210/605 |
| 4,919,815 | 4/1990 | Copa et al. | 210/603 |
| 4,954,259 | 9/1990 | Elmaleh et al. | 210/617 |
| 5,151,187 | 9/1992 | Behmann | 210/625 |

*Primary Examiner*—Christopher Upton
*Attorney, Agent, or Firm*—Richards, Medlock & Andrews

[57] ABSTRACT

A process and apparatus is disclosed for treating waste water. After treatment, essentially no sludge remains for disposal. The treatment includes mixing the waste water with activated sludge solids in an aeration tank (15). The mixed liquor from the tank is then moved to a clarifier settling tank (17). About 5-25% of the activated sludge separated in the settling tank is returned to an aerobic digester (23) and treated for about 16-24 hours. The aerobic digester can be a batch unit or a continuous process unit. After treatment in the aerobic digester, the activated sludge solids are returned to the aeration tank (15).

8 Claims, 2 Drawing Sheets

5,356,537

METHOD AND APPARATUS FOR TREATING WASTE WATER

CROSS REFERENCE TO RELATED APPLICATIONS

This application is a continuation-in-part of U.S. patent application Ser. No. 889,853 filed May 28, 1992.

TECHNICAL FIELD OF THE INVENTION

This invention relates to the treatment of waste water. In particular, the invention relates to a modified activated sludge treatment.

BACKGROUND OF THE INVENTION

The activated sludge process has been used for many years for the treatment of waste water. This process involves the treatment of waste water through the use of suspended biological solids whose activity and quantity is controlled by the addition of oxygen. The aerobic bacteria feeds and grows on the material in the waste water which can be oxidized.

The effluent sewage or waste water is introduced into an aeration tank along with activated sludge. The activated sludge is recycled from final sedimentation tanks. The aeration tank aerates and mixes the waste water and the activated sludge sufficiently to supply the oxygen required by the bacteria in the sludge.

The mixture of waste water and activated sludge, called "mixed liquor", then flows into a settling tank. In the settling tank, the activated sludge solids are separated from the clean, treated water. The activated sludge solids are then returned to the aeration tank to provide the activated sludge for new waste water. In some cases, a sludge reaeration tank is used to aerate the return sludge, but before the sludge is returned to the aeration tank.

U.S. Pat. No. 3,047,492 to Gambrel discloses a sewage process which incorporates an aerobic digester which feeds back into an aeration tank. The patent teaches that, of the sludge removed from the settling tank into the sludge hopper, about 12% should be moved to the aerobic digester and the remaining 88% directed back to the aeration tanks. The patent suggests the aerobic digester operate 14–15 days. However, this length of time is impractical in application because a continuous cycle would require a large number of separate aerobic digesters in order to provide sufficiently aged sludge to maintain the process.

A need continues to exist for more efficient and effective waste water treatment techniques. In processes today, a large quantity of sludge results from the process which must be disposed of. Significant funds are expended by municipalities in disposing of this sludge through the methods approved for the disposal, such as landfill and the like. A process which reduces the resultant quantity of sludge would be of great benefit in reducing the cost of this disposal.

SUMMARY OF THE INVENTION

In accordance with one aspect of the present invention, a process is provided for treating waste water which includes the steps of supplying the waste water to an aeration tank and aerating the waste water therein in the presence of activated sludge to create a mixed liquor. The process further includes the step of moving the mixed liquor to a clarifier settling tank. The process then includes the step of drawing about 5–25% of the activated sludge solids from the clarifier settling tank to an aerobic digester and holding the activated sludge solids in the aerobic digester for about 16–24 hours. The activated sludge solids are then transferred from the aerobic digester to the aeration tank.

In accordance with another aspect of the process, the remaining activated sludge solids in the clarifier settling tank are returned to a reaeration tank and then returned to the aeration tank.

In accordance with another aspect of the present invention, an apparatus is provided for treating waste water which includes an aerator mixing waste water with activated sludge to create a mixed liquor. A clarifier settling tank receives the mixed liquor from the aeration tank and separates the solid components of the mixed liquor from the liquid components. An aerobic digester draws about 5–25% of the activated sludge solids from the clarifier settling tank and holds the solids for about 16–24 hours. Finally, the aerobic digester moves the activated sludge solids back into the aeration tank.

BRIEF DESCRIPTION OF THE DRAWINGS

For a more complete understanding of the present invention and for further advantages thereof, reference is now made to the following description of the preferred embodiment taken in conjunction with the accompanying drawings, in which.

DETAILED DESCRIPTION

Figure 1:
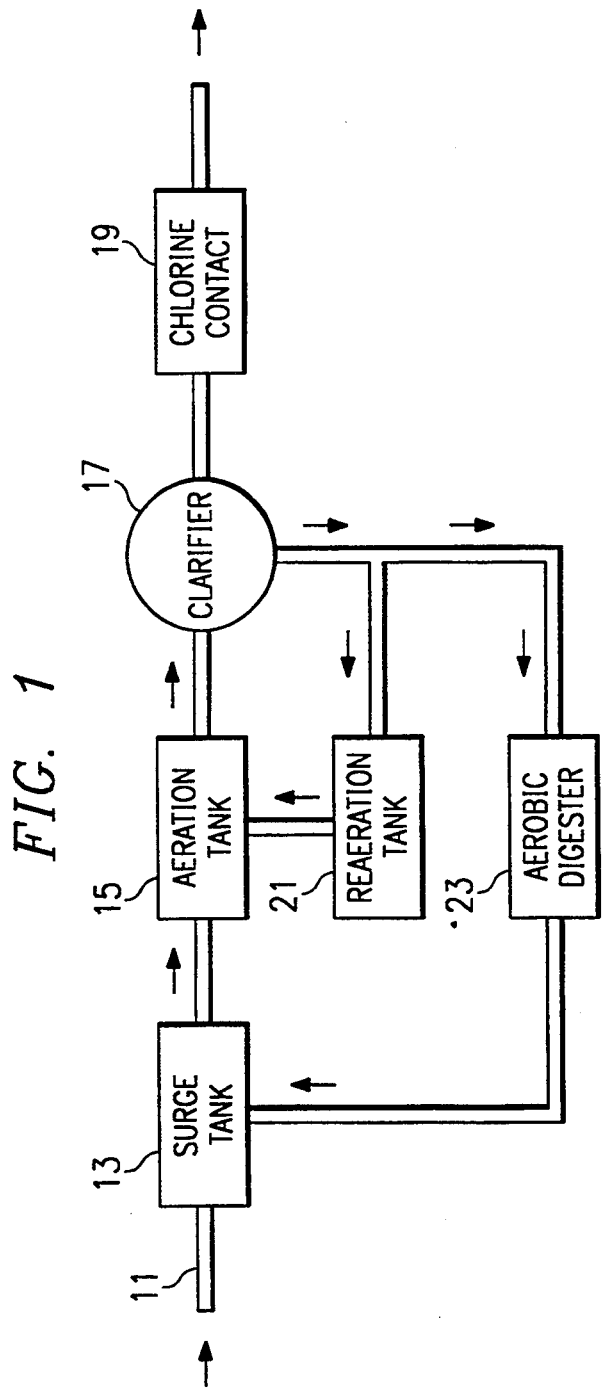
FIG. 1 is a schematic representation of the process of the present invention.

With reference to FIG. 1, the process of the present invention can be described. The effluent waste water flows through an inlet 11 into a surge tank 13. From the surge tank 13, the waste water flows to an aeration tank 15. In the aeration tank 15, the waste water is mixed with activated sludge to formed mixed liquor, and the aerobic bacteria in the sludge reacts with oxidizable material in the waste water.

The mixed liquor then flows into a separator 17 formed by a clarifier settling tank. The clarifier settling tank 17 separates the activated sludge solids from the treated water components of the mixed liquor. The treated water flows on into a chlorine contact tank 19 where the water is chlorinated. Once chlorinated, the water can then undergo additional treatment, if desired, or be discharged as treated outflow.

Activated sludge solids are removed from the clarifier settling tank 17. 75% to 95%, preferably about 90%, of the activated sludge solids are pumped to a reaeration tank 21, where the sludge is mixed with air to add oxygen. The reaerated sludge is then returned to the aeration tank 15 or to the surge tank 13. This provides activated sludge to be mixed with the effluent waste water in the aeration tank 15. The remaining 5–25% of the activated sludge solids from the clarifier settling tank 17 is pumped into an aerobic digester 23. The sludge is kept in the aerobic digester 23 for a period of at least 16 hours and preferably 18–24 hours. Air in the digester 23 is used to oxidize the solids in the sludge, turning nitrites into nitrates.

When the process is to be continuous, sludge is constantly added to the aerobic digester 23 at one end of the digester while a like amount of sludge having remained in the digester for 16–24 hours is removed from the other end of the digester 23 and returned to either the surge tank 13 or the aeration tank 15. The aerobic digester 23 can also be treated as a batch unit where the digester is filled completely from the clarifier settling tank 17, the activated sludge retained in the aerobic digester 23 for 16–24 hours, and then the entire contents of the aerobic digester provided back to the aeration tank 15 or surge tank 13. In such a batch process, it may be desirable to have a number of aerobic digesters in a staggered time sequence so that the treated sludge from a digester 23 can be supplied to the aeration tank 15 or surge tank 13 on a more continuous basis.

Figure 2:
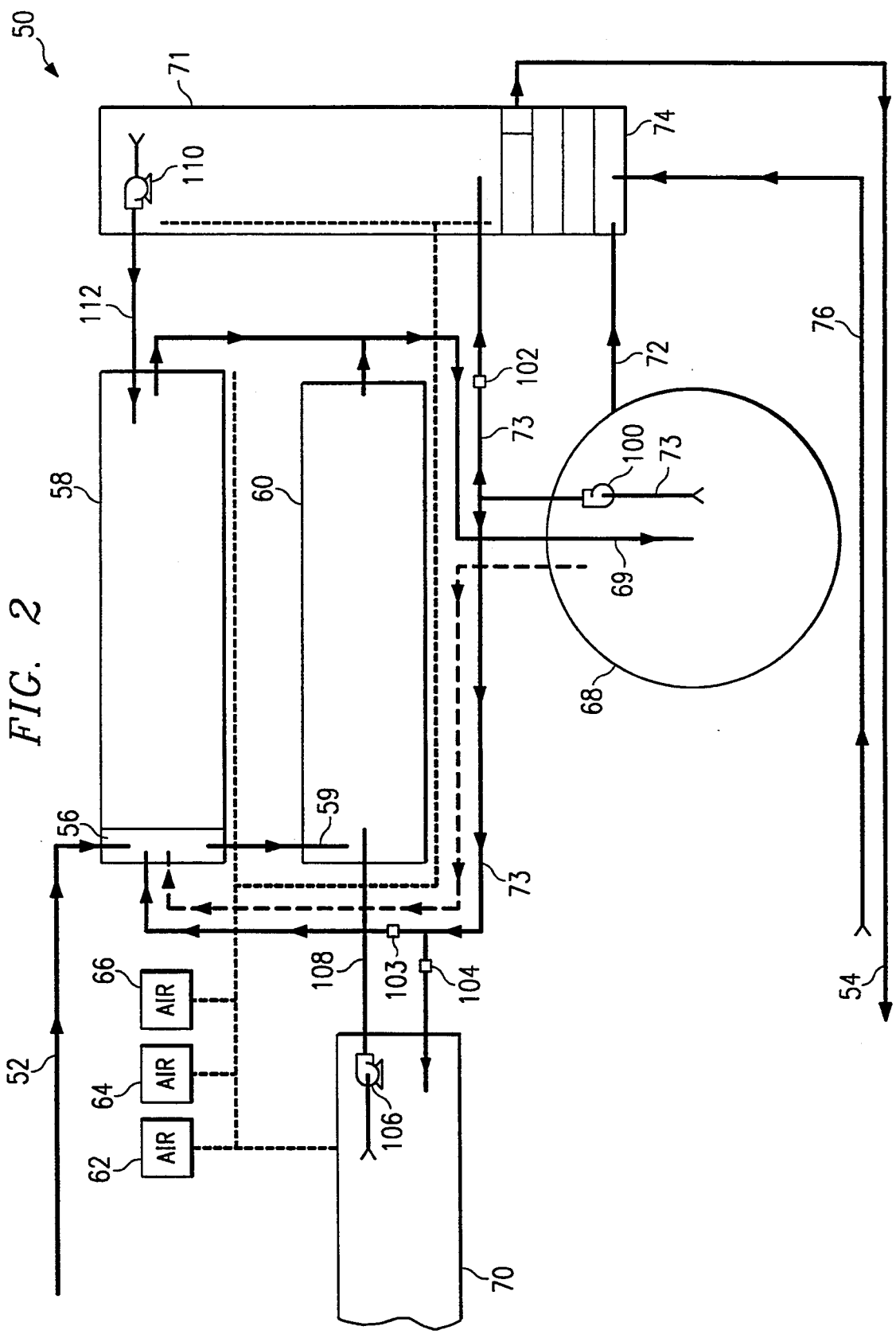
FIG. 2 is a view of an apparatus performing waste water treatment in accordance with the teachings of the present invention.

FIG. 2 illustrates a plant 50 which has been constructed to treat waste water in accordance with the present invention. The raw sewage influent line 52 is designed to handle about 200,000 gallons per day. An average person in a residential household is normally expected to generate about 100 gallons per day of waste water so the plant illustrated can be seen to be suitable to treat a residential area of about 2000 persons or the equivalent capacity for business. Through the treatment of the plants, about 40,000 gallons of the influent is either evaporated or converted into gas through the treatment process. Thus, the effluent discharge line 54 will be expected to discharge about 160,000 gallons per day of chlorinated treated water to be discharged into a river, reservoir or the like. The process has proven to generate essentially no net sludge for disposal. Thus, the plant has eliminated essentially all problems dealing with the need to properly dispose of sludge commonly encountered in treatment plants today.

The influent line 54 discharges onto a bar screen 56 on aeration tank 58. The bar screen 56 has a series of spaced bars to catch large debris such as logs, branches, and the like. The inflow passed the bar screen 56 then flows into a pair of aeration tanks 58 and 60. Tank 60 is connected to tank 58 by line 59. Aeration tank 58 has a capacity of approximately 46,970 gallons. Aeration tank 60 has a capacity of 45,938 gallons. Already present in the aeration tanks are activated sludge. Air blowers 62, 64 and 66 supply air under pressure into the aerator tanks in a method well known in the art to mix the oxygen in the air with the waste water and the activated sludge to generate a mixed liquor which begins the treatment process. Each of the aerator tanks are about 30 feet long, 14 feet wide and approximately 10–12 deep. The aerator tanks are open to the atmosphere.

From the aerator tanks, the mixed liquor is pumped to the clarifier settling tank 68 in line 69. The mixed liquor in this tank will begin to separate into liquid components and solid components. The solid components will fall toward the bottom of the settling tank where they are raked off the bottom of the tank and collected. Approximately 5–25%, and preferably 10%, of the solids are pumped by air lift pump 100 to the aerobic digesters 70 and 71 through line 73. The remainder of the sludge is returned to aeration tank 58 through line 73. Valves 102, 103 and 104 control the amount of sludge pumped to the aerobic digesters and the aeration tank.

The clarifier settling tank 68 has a capacity of 46,319 gallons. The tank 68 is provided with a weir at the top so that the overflow of clear liquor is supplied through line 72 to the chlorine contact tank 74. A chlorine line 76 supplies chlorine from a chlorine source to the tank 74 for mixing with the clear liquor. With a sufficient quantity of chlorine, the water in tank 74 is essentially clean and can be directly discharged through the effluent discharge line 54. However, if additional treatment is needed or desired for a particular reason, this additional treatment can be rendered to the fluid prior to discharge.

The activated sludge solids removed from the tank 68 and pumped to the aerobic digesters 70 and 71 will be held in the aerobic digesters 70 and 71 for a period between 16 to 24 hours. The air blowers 62, 64 and 66 will provide air under pressure to the aerobic digesters during this entire period. In a continuous batch process, provisions will be made for continuous passage of the activated sludge solids through the aerobic digesters 70 and 71 so that the solids are retained in the digesters for a period of 16–24 hours, but there is a continuous inflow of sludge from the tank 68 to the aerobic digesters 70 and 71 and a continuous discharge from the aerobic digesters 70 and 71 to the aeration tanks 58 and 60. Aerobic digesters 70 and 71 each have a capacity of about 53,000 gallons. The sludge from aerobic digester 70 is pumped into aeration tank 60 by air lift pump 106 through line 108. Sludge is pumped from aerobic digester 71 to aeration tank 58 by air lift pump 110 through line 112.

In the plant 50, the remaining quantity of activated sludge solids from the clarifier settling tank 68 are moved directly back into the aeration tanks through line 73 as previously mentioned. If desired, an additional tank, forming a reaeration tank, can be used intermediate the return from the clarifier settling tank 68 to the aerator tanks 58 and 60.

In the aerator tanks, the oxygen in the air pumped in by the blowers 62, 64 and 66 will oxidize the nitrites in the waste water, converting the material into nitrates while generating carbon dioxide and reducing the solid mass in the waste water. This process also occurs in the treatment of the solid sludge in the aerobic digester 70.

It has been found in operation of the plant 50 that essentially no solid sludge remains after the treatment process. Thus, there is no concern about disposal of the sludge which is a costly and difficult process. In the process, the solid content of the effluent treated water is found to have less than 15 parts per million and the BOD (Bio Oxygen Demand) which should not exceed a level 10, is continuously running at less than 1 in the plant.

Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. A process for treating waste water, including the steps of:
   moving the waste water to an aeration tank and aerating the waste water therein in the presence of activated sludge to create a mixed liquor;
   moving the mixed liquor to a clarifier settling tank;
   drawing about 5–25% of the activated sludge solids off of the clarifier settling tank to an aerobic digester;
   holding the activated sludge solids in the aerobic digester for about 16–24 hours;
   digesting the activated sludge solids aerobically in the aerobic digester;
   returning the activated sludge solids from the aerobic digester to the aeration tank.

2. The process of claim 1 further comprising the step of drawing the remaining about 75-95% of the activated sludge solids from the clarifier settling tank and returning the solids to the aeration tank.

3. The process of claim 1 further comprising the step of drawing the remaining about 75-95% of the activated sludge solids from the clarifier settling tank to a reaeration tank, and returning the activated sludge solids from the reaeration tank to the aeration tank.

4. The process of claim 1 wherein the step of holding the activated sludge solids in the aerobic digester is a continuous process with a continuous entry of activated sludge solids from the clarifier settling tank into the aerobic digester and a continuous return of activated sludge solids from the aerobic digester to the aeration tank.

5. The process of claim 1 wherein the step of holding the activated sludge solids in the aerobic digester is a batch process with a batch of activated sludge solids moved from the clarifier settling tank into the aerobic digester and the batch of activated sludge solids being returned from the aerobic digester to the aeration tank after about 16–24 hours.

6. The process of claim 5 wherein the step of holding the activated sludge solids in the aerobic digester is a multiple batch process, a given batch being transferred from the clarifier settling tank into the aerobic digester and the given batch being subsequently returned from the aerobic digester to the aeration tank, a plurality of batches being held in the aerobic digester simultaneously.

7. The process of claim 6 wherein a plurality of aerobic digesters are used to hold batches of sludge solids simultaneously.

8. The process for treating waste water of claim 1 further comprising the steps of returning the activated sludge solids initially from the aerobic digester to a surge tank and subsequently returning the activated sludge solids from the surge tank to the aeration tank.

* * * * *